United States Patent [19]
Brooks

[11] 3,946,170
[45] Mar. 23, 1976

[54] SELF REGULATING TELEPHONE SETS

[76] Inventor: Fred A. Brooks, 37 Lancaster Ave., Maplewood, N.J. 07040

[22] Filed: Nov. 29, 1973

[21] Appl. No.: 420,330

[52] U.S. Cl. ........ 179/170 R; 179/170.2; 179/1 VL
[51] Int. Cl.² ......................................... H04M 9/08
[58] Field of Search ......... 179/170 R, 170 C, 170.2, 179/16 F, 1 VL, 1 SC

[56] References Cited
UNITED STATES PATENTS

| | | | |
|---|---|---|---|
| 3,483,335 | 12/1969 | Piotrowski | 179/170 R |
| 3,567,873 | 3/1971 | Peroni | 179/170.2 |
| 3,585,311 | 6/1971 | Berkley et al. | 179/170.2 |
| 3,699,271 | 10/1972 | Berkley et al. | 179/170.6 |

*Primary Examiner*—Douglas W. Olms
*Attorney, Agent, or Firm*—Joseph E. Rusz; George Fine

[57] ABSTRACT

A self regulating telephone apparatus wherein an individual's speech is converted to a representative electrical signal. This signal is represented by a product wave or waves of the form $f(A)t \times f(B)t$ where $f(A)t$ represents the amplitude of the informational signal $f(B)t$. The signal is separated by demodulation of the cross product into its components. The relative amplitudes of the terms are changed as desired and the cross product re-established by remodulation. Since the term $f(A)t$ represents the amplitude and its frequency range is removed from $f(B)t$, amplification can be provided at frequencies exhibiting low coupling between the receiver and transmitter transducer in a hand telephone set to permit increasing the signal volume output as required.

5 Claims, 2 Drawing Figures

SELF REGULATING TELEPHONE SETS

CROSS REFERENCE TO RELATED APPLICATION

The present invention is related to the improvement patent application entitled "FOUR-WIRE INTERFACE REGULATOR FOR LONG DISTANCE TRUNK CIRCUITS", by Fred A. Brooks, filed even date herewith.

BACKGROUND OF THE INVENTION

The object of this invention is to provide an increased and more constant output volume telephone set for a universe of long distance talkers within a fixed range of sound pressures. The present telephone set and universe of local offices are deficient in volume output when sending to long distance trunk circuits through local plant cable losses. The extent of the deficiency was indicated by a limited Bell System volume survey in the 1950–1960 decade. The survey indicated a mean reduction from previous information to which the transmission systems was designed by about 12 vu. The output of the standard telephone is limited by local loop gain or "howl" margin in the two-wire telephones and loop around gain in four-wire transmission systems. A carbon granular transducer receives excitation current from the nearest switching office or it is supplied locally. When the current is supplied from the switching office, it is used to establish a request for service by a switchhook signal. The direct current path thus established is systematically interrupted to transmit the desired calling number to establish a connection at the switching office. The requirement for switchhook and calling number circuit limit the resistance permitted and provided in the local loop circuit to the switching office. The current delivered to the more distant transmitting transducer is but a fraction of that supplied on short calling loop circuits. In order to provide increased output with the longer local loop circuits, a dynamic type transducer can be used to reduce the current delivered from the switching office. Increased transducer response can be obtained by using transistor ampifiers for voice, switchhook and touch tone dialing. The object of this invention is to obtain increased sensitivity in the transducer circuit of the telephone and obtain increased output at a more constant volume with adequate and necessary howl and four-wire loop around margins. The output of the present telephone set could be increased by reducing the sensitivity of the receiver or receiving circuit and increasing the gain of the transmitting transducer and/or removing the so-called "equalizer" which introduces about 5 db of loss for shorter loops. A material reduction in the receiving sensitivity could be made to permit adequate transmitting signals but decreased receiving gains.

This invention permits increased and more constant volume from a hand set made up of a sound pressure to electrical signal transducer and a receiver to convert electrical signals to sound pressure waves. The talker signal either acoustic or electric is generally accepted as consisting of a convolution of components representing vocal cord timing, glottal pulses and vocal tract impulse responses that is $f(A)t \times f(B)t$. The convoluted signal is separated by demodulation of the cross product into its components and selecting either component by appropriate filters. The frequency content of the demodulated voice signals extended from near direct current to those frequencies normally considered essential to understand the talker were measured. The amplitude of the informational signal is contained in the term $f(A)t$. When separated the individual terms can be relatively increased or decreased in amplitude as desired.

SUMMARY OF THE INVENTION

Self regulating telephone sets are provided. A talker's sound pressure wave is generally accepted as represented by a convolution of components contributed by vocal cord timing, glottal pulses and voice tract impulses. That is, the signal can be represented by a product wave or waves of the form $f(A)t \times f(B)t$. $f(A)t$ represents the amplitude of the informational signal $f(B)t$. The frequencies of the two components are separated by some region or overlap slightly, the major terms are recovered and separated by a process of demodulation and filtering. The relative amplitude of the terms are changed and the cross product reestablished by remodulation without serious degradation of the voice signal quality. Since the term $f(A)t$ represents the amplitude and its frequency range is removed from $f(B)t$, amplification can be provided at frequencies exhibiting low coupling between the receiver and the transmitting transducer in a hand set or through an air path to permit increasing the signal volume output as required. Increased margin to "howling" can be provided by inserting a loss at low amplitudes (center clipping) and by decreasing the receiver sensitivity during local talker activity. Further, a deconvolution circuit can be included in the receiver lead to increase the howl margin, or loop around gain and provide a more constant output for the received signal.

DETAILED DESCRIPTION OF THE PREFERRED EMBODIMENT

It is noted that the electrical voice signal is made up of relatively high frequencies in transmitting voiced signals and hiss signals in unvoiced components. Both types of signals are controlled by frequencies of about 30 Hertz. The high frequencies are transmitted directly and carry sidebands modulated by the low frequency control signals. In order to control and reduce the difference between talkers, the signal is demodulated to separate the components to reduce the range of the informational signal. The relative amplitude of the signal amplitude is changed by the demodulating to obtain the signals at base band from 0 – 30 Hertz and 200 to about 4 K Hertz. That is, the signal transmitted is of the form a sin $w_1t \times b$ cos $w_2t$, separating components to a sin $w_1t$ and b cos $w_2t$ and modifying the relative amplitude of the terms. This changes the range required in the medium when the low frequency component is changed (reduced) relative to the informational content contained in the second term.

Figure 1:
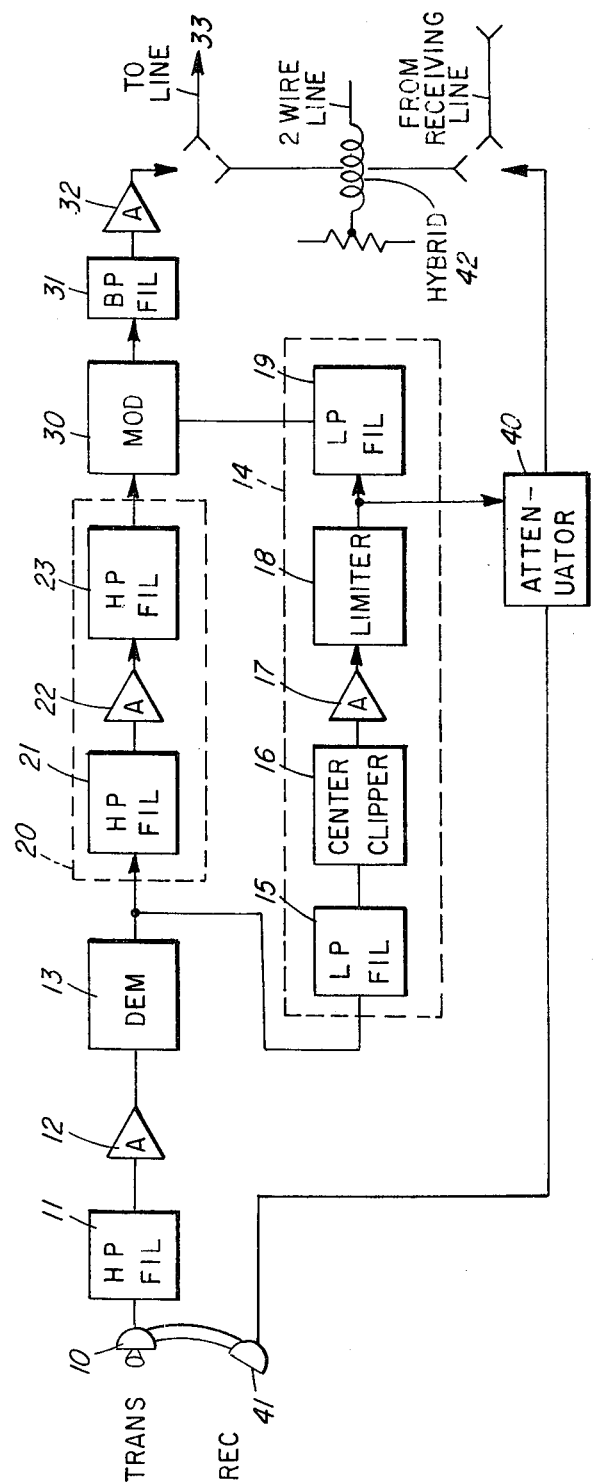
FIG. 1 shows an embodiment of a self regulating telephone set.

Now referring in detail to FIG. 1, there is shown an improved telephone set exclusive of a conventional power supply with appropriate voltages. It is noted that the system may be utilized for two-wire and four-wire telephone circuits. An acoustical wave is applied to electrical transducer 10 to furnish a voice signal through high pass filter 11 to amplifier 12 to apply a signal containing a convolute wave in the form of $f(A)t \times f(B)t$. This signal out of the transmitting transducer is applied to democulator 13 to separate the components of the voice signal into $f(A)t$ and $f(B)t$. The term $f(A)t$ is representative of the amplitude of the $f(B)t$ term, it occurs at a low frequency in the range below about 100 Hertz, the informational term occupies the frequency range from about 0.2 to 3.4 kilo Hertz. This range is usually taken for voice band and represents the informational content of the convolutional wave. The amplitude of the components can now be changed relatively as they appear in different frequency bands. If the gain in the voice band of an ordinary telephone were materially increased to deliver added signal volume, a howl or oscillations due to coupling in the hand set or through an air path would take place. The howl and margin limits the amount of gain that can be introduced in the output of the transducer. The mean signal generated in the transducer from a universe of talkers making long distance calls is down from volumes measured to establish carrier systems load capacity in some areas of the Bell System by as much as 12 vu. The gain in low frequency branch 14 is set to raise the output by enhancement required to deliver the desired output as determined by the limiter or regulator. When the signal applied is removed, the voltages in low frequency branch 14 are reduced to that of the noise present. Low frequency branch 14 is comprised of low pass filter 15 receiving an output from demodulator 13. Low pass filter 15 passes a range of frequencies below 100 Hertz. Conventional center clipper 16 center clips the output of low pass filter 15 which is then passed through amplifier 17 to limiter 18. In place of limiter 18 there may be substituted a regulator. The output of limiter 18 is received by modulator 30 by way of low pass filter 19.

Noise voltages below the effective center clipping level and hence the low amplitude signal experience a substantial loss, the signal voltages will not build up and howl as long as the gain around the loop or loops are below the critical value. The applied signal as indicated hereinbefore is made up of two parts, $f(A)t$ and $f(B)t$. The relative amplitude of $f(B)t$ is maintained by providing amplification in high pass branch 20 to nullify the incidental losses and deliver the informational signal as one of the inputs to output modulator 30. High pass branch 20 is comprised of high pass filter 21, amplifier 22, and high pass filter 23. The amplitude term $f(A)t$ is maintained by providing amplification in the low pass branch to nullify the incidental losses and deliver the amplitude signal as one of the inputs to output modulator 30. The output of modulator 30 is fed to output line 33 by way of bandpass filter 31 and amplifier 32.

The amplitude term $f(A)t$ in the frequency range below about 100 Hertz has been center clipped to add losses at low voltages. The signal amplitude above the clip level has been amplified to drive a limiter circuit or amplitude regulator to deliver a signal when modulated with the informational signal from the high pass branch to that required to obtain the necessary volume in the local plant, to the long distance trunk circuits and to the distant listeners circuit at the desired volume.

The combined gains and losses in the two branches are below that required to make the telephone set howl in either the informational or amplitude component circuit, with no input in the informational branch the gain is well below the howl gain. With no input in the low pass amplitude branch the loss in the circuits is determined by the gain at low amplitudes limited by the loss inserted by the center clipping circuit.

When the near talker is active, a control signal is generated which is available at the output of limiter 10 and it is fed to conventional voltage controlled attenuator 40 which is inserted in the receiver circuit to reduce the sensitivity in receiver 41 during busy periods at the near end. This reduces loop around gain. Attenuator 40 may be a voltage controlled amplifier whose initial gain is less than 1.

The telephone set may be connected to hybrid 42 for two-wire operation or the individual lines may be connected to a four-wire telephone trunk circuit. When connected to a four-wire telephone circuit, the control lead and loss control element reduces the loop around loss in the four-wire circuit.

Figure 2:
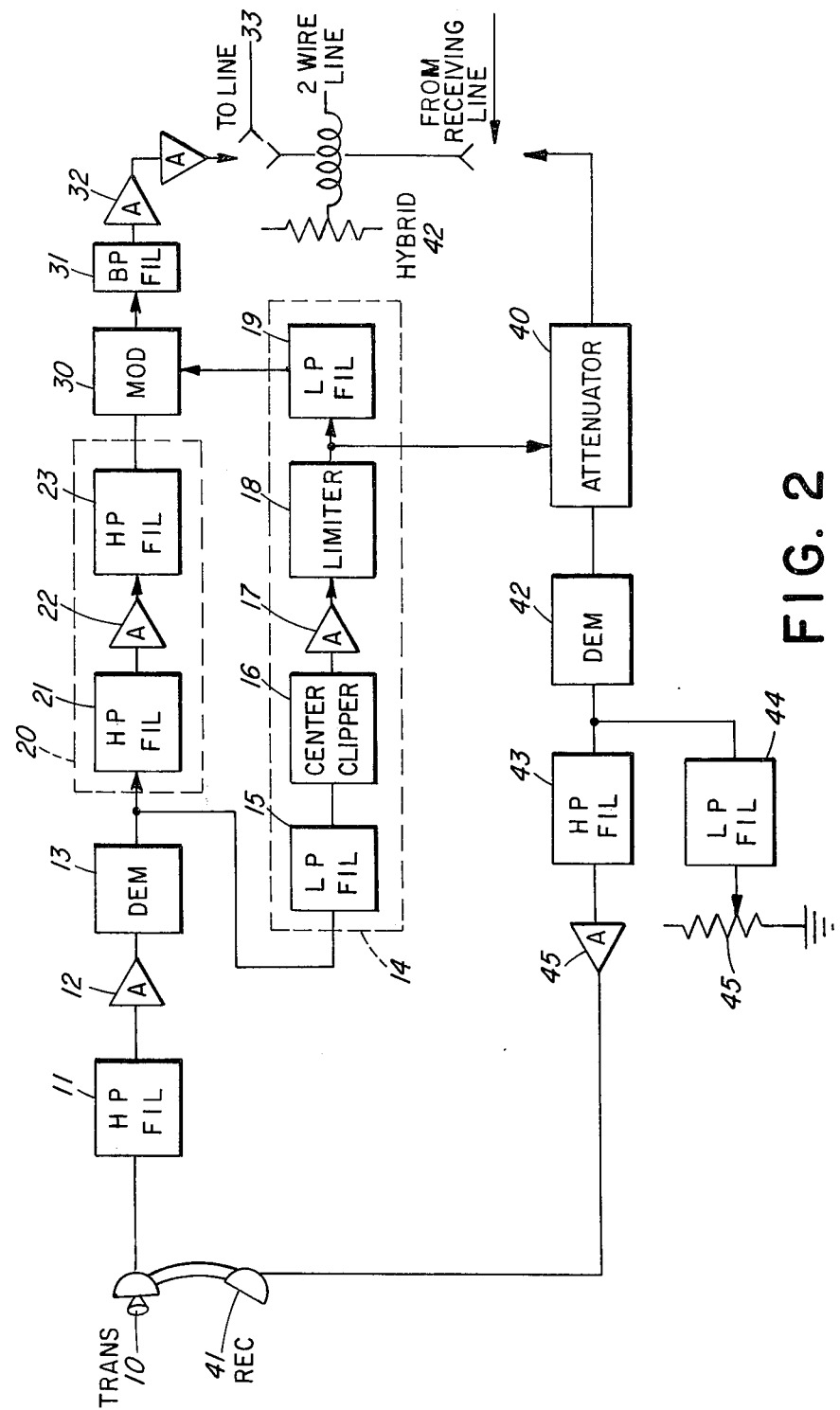
FIG. 2 shows a second embodiment of a self regulating telephone set.

Referring to FIG. 2, there is shown the second preferred embodiment with like components bearing the same characters as in FIG. 1 and operating in the same fashion. Self regulation is provided in receiving telephone 41 to regulate the received signal and control the howl gain. Demodulator 42 is introduced in the receiver circuit to remove the amplitude term and deliver a constant volume to the listener and reduce the return signal from the local talker through the hybrid coil from the enhancing circuit. The loss introduced in the receiving lead depends upon the relative amplitude of the informational signal and the amplitude term, which may have been enhanced in the transmitting transducer branch circuit. Signals received from the transmission trunk circuit will contain low frequency amplitude terms of the originating talker as modified by changes due to transmission loss stability.

Losses introduced in the return path in demodulator 42 and high pass and low pass filters 43 and 44 will increase the loop loss and can be made to counteract the enhanced amplitude introduced by the transmitting transducer circuit. The demodulator and filter set will introduce loss to the signal received and can be adjusted to furnish a more nearly constant received volume. It is noted adjustable resistor 45 terminates low pass filter 44 and the signal frequencies passed thereby may be adjustably terminated. The output of high pass filter 43 is passed through amplifier 45 to telephone receiver 41.

FIG. 2 shows the application of the invention to increase the telephone set output and to deliver approximately constant volume to the outgoing line and to the receiver. In addition to providing increased howl margin with increased telephone set output, the circuit shows a means of providing the same receiver sensitivity as well as regulating the volume delivered to the listener. This figure shows self regulation at the telephone set output and regulation of the signal delivered to the listener. The loss introduced by demodulator 42 and high and low pass filters 43 and 44 can adjust for the signal amplitude dissipated in the modulator and low pass filter output. The loss introduced by the demodulator and high pass filters can be nullified by the gain introduced by amplifier 45 to deliver the desired volume to the telephone set receiver. The loss introduced by the demodulator filters and amplifier 45 can be set to increase howl margin in addition to the margin provided in the transmitting transducer circuit.

What is claimed is:

1. A self regulating telephone set for a telephone system having a local plant and long distance trunk circuits comprising a transmitting transducer receiving voice signals represented by product waves of the form $f(A)t \times f(B)t$ where $f(A)t$ represents the amplitude of informational signal $f(B)t$ and a high frequency wave $f(B)t$, said voice signals being converted to representative electrical signals, a first demodulator receiving said representative signals, said first demodulator providing output signals permitting separation thereafter of the signal representative of $f(B)t$ and the signal representative of $f(A)t$, a high frequency branch including a first high pass filter, a first amplifier of preselected gain to nullify losses, and a second high pass filter in a series arrangement in the recited sequence, said high frequency branch passing exclusively the signal representative of $f(B)t$, a low frequency branch including a first low pass filter, a center clipper, a second amplifier, a limiter, and a second low pass filter in a series arrangement in the recited sequence, said low frequency branch passing only the signal representative of $f(A)t$, said second amplifier having a preselected gain to nullify incidental losses, a modulator simultaneously receiving the output signals at predetermined magnitudes from said high and low pass branches to provide a constant output transmission signal therefrom to obtain a preselected volume for said local plant and long distance trunk circuits.

2. A self regulating telephone set as described in claim 1 further including a receiving transducer associated with said transmitting transducer, said receiving transducer converting electrical signals into representative voice signals, a receiving line for said receiving transducer, a voltage controlled attenuator interposed in said receiving line, said voltage controlled attenuator receiving a control signal from said limiter.

3. A self regulating telephone set as described in claim 2 further including a third high pass filter in a series arrangement with a third amplifier, said series arrangement being interposed between said transmitting transducer and said first demodulator.

4. A self regulating telephone set as described in claim 1 further including a receiving transducer associated with said transmitting transducer, a receiving line, a voltage controlled attenuator interposed in said receiving line, said voltage controlled attenuator receiving a control signal from said limiter, a second demodulator receiving an output signal from said voltage controlled attenuator, a third high pass filter interconnecting said second demodulator and said receiving transducer.

5. A self regulating telephone set as described in claim 4 further including a third low pass filter receiving the output signal from said second demodulator, and an adjustable resistor connected between the output of said third low pass filter and ground to adjustably dissipate low frequency signal components.

* * * * *